United States Patent
Chae et al.

(10) Patent No.: US 12,068,470 B2
(45) Date of Patent: Aug. 20, 2024

(54) METHOD OF PRODUCING NEGATIVE ELECTRODE FOR SECONDARY BATTERY

(71) Applicant: LG ENERGY SOLUTION, LTD., Seoul (KR)

(72) Inventors: Oh Byong Chae, Daejeon (KR); Sang Wook Woo, Daejeon (KR); Ye Ri Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 638 days.

(21) Appl. No.: 17/292,470

(22) PCT Filed: Jan. 23, 2020

(86) PCT No.: PCT/KR2020/001173
§ 371 (c)(1),
(2) Date: May 10, 2021

(87) PCT Pub. No.: WO2020/153790
PCT Pub. Date: Jul. 30, 2020

(65) Prior Publication Data
US 2022/0020976 A1    Jan. 20, 2022

(30) Foreign Application Priority Data

Jan. 25, 2019  (KR) .................. 10-2019-0009787

(51) Int. Cl.
*H01M 4/04* (2006.01)
*H01M 4/02* (2006.01)
*H01M 4/38* (2006.01)
*H01M 4/583* (2010.01)

(52) U.S. Cl.
CPC ......... *H01M 4/0445* (2013.01); *H01M 4/043* (2013.01); *H01M 4/386* (2013.01); *H01M 4/583* (2013.01); *H01M 2004/027* (2013.01)

(58) Field of Classification Search
CPC .... H01M 4/0445; H01M 4/043; H01M 4/386; H01M 4/583; H01M 2004/02
See application file for complete search history.

(56) References Cited

U.S. PATENT DOCUMENTS

| | | | |
|---|---|---|---|
| 9,837,625 B2 * | 12/2017 | Inoue .................. | H10K 85/342 |
| 9,837,659 B2 | 12/2017 | Balogh et al. | |
| 2017/0187030 A1 * | 6/2017 | Grant .................. | C25D 7/0657 |
| 2017/0301910 A1 | 10/2017 | Wang et al. | |
| 2017/0338480 A1 * | 11/2017 | Kim .................... | H01M 4/1395 |
| 2018/0286597 A1 | 10/2018 | Kawai et al. | |
| 2019/0181428 A1 * | 6/2019 | Nishiura .............. | H01M 4/134 |
| 2019/0305298 A1 | 10/2019 | Chae et al. | |
| 2020/0235419 A1 | 7/2020 | Chae et al. | |
| 2020/0259164 A1 * | 8/2020 | Wang .................. | H01M 4/587 |

FOREIGN PATENT DOCUMENTS

| | | |
|---|---|---|
| CN | 101459262 A | 6/2009 |
| CN | 104538194 A | 4/2015 |
| CN | 105322230 A | 2/2016 |
| CN | 105845894 A | 8/2016 |
| CN | 106716682 A | 5/2017 |
| CN | 107004844 A | 8/2017 |
| CN | 207398283 U | 5/2018 |
| JP | 2015-204437 A | 11/2015 |
| JP | 2016-110777 A | 6/2016 |
| JP | 2018-142528 A | 9/2018 |
| JP | 2018-147836 A | 9/2018 |
| JP | 2018-166140 A | 10/2018 |
| JP | 6448336 B2 * | 1/2019 |
| KR | 10-0291067 B1 | 6/2001 |
| KR | 10-2018-0127044 A | 11/2018 |
| KR | 10-2019-0007296 A | 1/2019 |
| WO | WO 2016/126046 A1 | 8/2016 |
| WO | WO 2019/013500 A2 | 1/2019 |

OTHER PUBLICATIONS

International Search Report for PCT/KR2020/001173 mailed on May 4, 2020.
Extended European Search Report for European Application No. 20746021.3, dated Nov. 11, 2021.

* cited by examiner

*Primary Examiner* — Matthew T Martin
*Assistant Examiner* — Bartholomew A Hornsby
(74) *Attorney, Agent, or Firm* — Birch, Stewart, Kolasch & Birch, LLP

(57) ABSTRACT

A method of producing a negative electrode for a secondary battery, which includes: forming a negative electrode structure including a negative electrode current collector having two surfaces and a negative electrode active material layer formed on at least one surface of the negative electrode current collector; preparing a pre-lithiation cell including the negative electrode structure, a lithium metal counter electrode disposed to face the negative electrode active material layer of the negative electrode structure, and a separator interposed between the negative electrode structure and the lithium metal counter electrode; immersing the pre-lithiation cell in a pre-lithiation solution; and carrying out pre-lithiation by electrochemically charging the pre-lithiation cell while pressing the pre-lithiation cell at a pressure of 15 kPa to 3,200 kPa.

10 Claims, No Drawings

METHOD OF PRODUCING NEGATIVE ELECTRODE FOR SECONDARY BATTERY

CROSS-REFERENCE TO RELATED APPLICATION

This application claims priority to and the benefit of Korean Patent Application No. 10-2019-0009787, filed on Jan. 25, 2019, the disclosure of which is incorporated herein by reference in its entirety.

TECHNICAL FIELD

The present invention relates to a method of producing a negative electrode for a secondary battery.

BACKGROUND ART

Recently, in response to the rapid spread of electronic devices using batteries, such as mobile phones, notebook computers, and electric vehicles, demand for secondary batteries having a small size, a light weight, and relatively high capacity is rapidly increasing. In particular, lithium secondary batteries have been in the spotlight as a driving power source for portable devices due to having a light weight and high energy density. Accordingly, research and development efforts for improving the performance of lithium secondary batteries have been continuously made.

The lithium secondary battery generally includes a positive electrode, a negative electrode, a separator interposed between the positive electrode and the negative electrode, an electrolyte, an organic solvent, and the like. In the positive electrode and the negative electrode, an active material layer including a positive electrode active material or a negative electrode active material may be formed on a current collector. In the positive electrode, a lithium-containing metal oxide such as $LiCoO_2$, $LiMn_2O_4$, or the like is generally used as a positive electrode active material, and, in the negative electrode, a carbon-based material or a silicon-based material which does not contain lithium is used as a negative electrode active material.

In the case of such a negative electrode, a passivation film such as a solid electrolyte interface layer (SEI layer) is formed on the surface of the negative electrode during initial charging. The passivation film interferes with the insertion of an organic solvent into the negative electrode and suppresses the decomposition reaction of an organic solvent so that the negative electrode structure is stabilized, the reversibility of the negative electrode is improved, and the negative electrode structure enables use as the negative electrode. However, the formation reaction of the passivation film, which is an irreversible reaction, leads to the consumption of lithium ions to reduce battery capacity and to the consumption of lithium ions with a repeated battery cycle to reduce capacity and degrade cycle lifespan.

Accordingly, a method of pre-lithiating the negative electrode by intercalating lithium into the negative electrode to promote the pre-formation of a passivation film on the surface of the negative electrode, the prevention of capacity degradation, and the improvement of cycle lifespan has been developed.

However, when the negative electrode is pre-lithiated, a volume expansion of or structural deformation of the negative electrode occurs due to the intercalation of an excessively large amount of lithium, and thus capacity and cycle characteristics may be degraded. In particular, when the volume of a negative electrode active material is expanded by the pre-lithiation, the negative electrode active materials cannot be located close to each other such that migration resistance of lithium is increased, and thus capacity may be degraded during long-term charging and discharging.

Therefore, there is a need to develop a negative electrode capable of promoting the reduction of resistance and the improvement of cycle characteristics while achieving the purpose of pre-lithiation.

Korean Registered Patent No. 10-0291067 discloses a method of pre-lithiating a carbon electrode and a method of producing a lithium secondary battery using the same.

PRIOR-ART DOCUMENTS

Patent Documents

Korean Registered Patent No. 10-0291067

DISCLOSURE

Technical Problem

The present invention is directed to providing a method of producing a negative electrode for a secondary battery, which, by pre-lithiating a negative electrode in a state of being pressed at a specific pressure in the pre-lithiation of a negative electrode, is capable of preventing volume expansion and structural deformation caused by pre-lithiation and maintaining proximity and contacts between negative electrode active materials so as to prevent the resistance of a negative electrode from being increased and realize a high capacity retention rate.

Technical Solution

One aspect of the present invention provides a method of producing a negative electrode for a secondary battery, which includes: forming a negative electrode structure including a negative electrode current collector having two surfaces and a negative electrode active material layer formed on at least one surface of the negative electrode current collector; preparing a pre-lithiation cell including the negative electrode structure, a lithium metal counter electrode disposed to face the negative electrode active material layer of the negative electrode structure, and a separator interposed between the negative electrode structure and the lithium metal counter electrode; immersing the pre-lithiation cell in a pre-lithiation solution; and carrying out pre-lithiation by electrochemically charging the pre-lithiation cell while pressing the pre-lithiation cell at a pressure of 15 kPa to 3,200 kPa.

Advantageous Effects

According to a method of producing a negative electrode for a secondary battery of the present invention, since a negative electrode is produced by pre-lithiating a negative electrode in a state of being pressed at a specific pressure in the pre-lithiation of a negative electrode, volume expansion and structural deformation caused by pre-lithiation can be prevented from occurring, and proximity and contacts between negative electrode active materials can be maintained so as to prevent the resistance of a negative electrode from being increased and realize a high capacity retention rate.

Modes of the Invention

Terms and words used in this specification and the claims should not be interpreted as limited to commonly used meanings or meanings in dictionaries and should be interpreted with meanings and concepts which are consistent with the technological scope of the invention based on the principle that the inventors can appropriately define concepts of terms in order to describe the invention in the best way.

The terminology provided herein is merely used for the purpose of describing particular embodiments, and is not intended to be limiting of the present invention. The singular forms "a," "an," and "the" are intended to include the plural forms as well, unless the context clearly indicates otherwise.

It should be understood that the terms "comprises," "comprising," "includes," "including," "has," and/or "having," when used herein, specify the presence of stated features, integers, steps, operations, elements, components and/or combinations thereof, but do not preclude the presence or addition of one or more other features, integers, steps, operations, elements, components and/or combinations thereof.

In the present invention, an average particle diameter ($D_{50}$) may be defined as a particle diameter corresponding to 50% of the cumulative volume in a particle diameter distribution curve. The average particle diameter ($D_{50}$) may be measured using, for example, a laser diffraction method. The laser diffraction method generally allows the measurement of a particle diameter ranging from a submicron level to several millimeters and may produce a result having high reproducibility and high resolution.

Hereinafter, the present invention will be described in detail.

<Method of Producing Negative Electrode for Secondary Battery>

The present invention provides a method of producing a negative electrode for a secondary battery, and specifically, a method of producing a negative electrode for a lithium secondary battery.

The method of producing a negative electrode for a secondary battery of the present invention includes: forming a negative electrode structure including a negative electrode current collector having two surfaces and a negative electrode active material layer formed on at least one surface of the negative electrode current collector; preparing a pre-lithiation cell including the negative electrode structure, a lithium metal counter electrode disposed to face the negative electrode active material layer of the negative electrode structure, and a separator interposed between the negative electrode structure and the lithium metal counter electrode; immersing the pre-lithiation cell in a pre-lithiation solution; and carrying out pre-lithiation by electrochemically charging the pre-lithiation cell while pressing the pre-lithiation cell at a pressure of 15 kPa to 3,200 kPa.

According to the method of producing a negative electrode for a secondary battery of the present invention, pre-lithiation is carried out while pressing a negative electrode structure at a specific pressure in the pre-lithiation of a negative electrode. In the case of conventional pre-lithiation, there is a concern about the volume expansion and structural deformation of a negative electrode caused by the intercalation of lithium, which leads to an increase in distance between negative electrode active materials such that the migration resistance of lithium is increased, and thus cycle characteristics are degraded during long-term charging and discharging. However, according to the method of producing a negative electrode for a secondary battery of the present invention, since pre-lithiation is carried out while pressing a negative electrode structure at a pressure of 15 kPa to 3,200 kPa, it is possible to prevent volume expansion caused by pre-lithiation and maintain proximity and contacts between negative electrode active materials, and thus the problems such as an increase in battery resistance and a degradation of a capacity retention rate may be effectively prevented.

The method of producing a negative electrode for a secondary battery of the present invention includes forming a negative electrode structure including a negative electrode current collector and a negative electrode active material layer formed on at least one surface of the negative electrode current collector.

The negative electrode current collector is not particularly limited as long as it does not cause a chemical change in the battery and has high conductivity. Specifically, as the negative electrode current collector, copper, stainless steel, aluminum, nickel, titanium, calcined carbon, copper or stainless steel whose surface has been treated with carbon, nickel, titanium, silver, or the like, an aluminum-cadmium alloy, or the like may be used.

The negative electrode current collector may typically have a thickness of 3 to 500 μm.

The negative electrode current collector may have fine irregularities formed on a surface thereof to increase the adhesion of a negative electrode active material. In addition, the negative electrode current collector may be used in any of various forms such as a film, a sheet, a foil, a net, a porous material, a foam, a non-woven fabric, and the like.

The negative electrode active material layer is formed on at least one surface of the negative electrode current collector. Specifically, the negative electrode active material layer may be formed on one surface or both surfaces of the negative electrode current collector and is preferably formed on both surfaces of the negative electrode current collector in view of the utilization of the negative electrode active material.

The negative electrode active material layer includes a negative electrode active material.

The negative electrode active material may include at least one selected from the group consisting of a carbon-based active material and a silicon-based active material.

The silicon-based active material may impart excellent capacity characteristics and excellent durability to a negative electrode for a secondary battery or a secondary battery of the present invention. Generally, in the case of the silicon-based active material, there is a concern about an increase in resistance and a decrease in cycle characteristics, which are caused by volume expansion and an increase in distance (a decrease in contact) between active materials by intercalation of lithium through pre-lithiation. However, according to the method of producing a negative electrode of the present invention, since a negative electrode is pre-lithiated while being pressed at a pressure of 15 kPa to 3,200 kPa, it is possible to realize the advantage of the silicon-based active material and, simultaneously, improve cycle characteristics.

The silicon-based active material may include a compound represented by $SiO_x$ ($0 \leq x < 2$). Since $SiO_2$ does not react with lithium ions, it is not possible to store lithium. For this reason, it is preferable that x is within the above-described range, and the silicon-based active material is more preferably SiO.

The silicon-based active material may have an average particle diameter ($D_{50}$) of 1 μm to 30 μm, and preferably, 3 μm to 15 μm in view of ensuring structural stability and reducing side reactions with an electrolyte during charging and discharging.

The carbon-based active material may impart excellent cycle characteristics or excellent battery lifetime characteristics to a negative electrode for a secondary battery or a secondary battery of the present invention.

Specifically, the carbon-based active material may include at least one selected from the group consisting of artificial graphite, natural graphite, hard carbon, soft carbon, carbon black, acetylene black, Ketjen black, Super P, graphene, and fibrous carbon and preferably includes at least one selected from the group consisting of artificial graphite and natural graphite.

The carbon-based active material may have an average particle diameter ($D_{50}$) of 10 μm to 30 μm, and preferably, 15 μm to 25 μm in view of ensuring structural stability and reducing side reactions with an electrolyte during charging and discharging.

Specifically, the negative electrode active material preferably includes both the silicon-based active material and the carbon-based active material in view of improving both capacity characteristics and cycle characteristics. Specifically, the negative electrode active material preferably includes the carbon-based active material and the silicon-based active material in a weight ratio of 50:50 to 95:5, and more preferably, 60:40 to 80:20. It is preferable that the weight ratio of the silicon-based active material and the carbon-based active material is within the above-describe range in view of improving both capacity characteristics and cycle characteristics.

The negative electrode active material layer may further include a binder and/or a conductive material in addition to the negative electrode active material.

The binder is used to improve adhesion between the negative electrode active material layer and the negative electrode current collector to accordingly improve battery performance. The binder may include, for example, at least one selected from the group consisting of a polyvinylidene fluoride-hexafluoropropylene copolymer (PVDF-co-HFP), polyvinylidene fluoride (PVDF), polyacrylonitrile, polymethyl methacrylate, polyvinyl alcohol, carboxymethylcellulose (CMC), starch, hydroxypropylcellulose, regenerated cellulose, polyvinylpyrrolidone, polytetrafluoroethylene, polyethylene, polypropylene, polyacrylic acid, an ethylene-propylene-diene monomer (EPDM), a sulfonated-EPDM, styrene butadiene rubber (SBR), fluorine rubber, polyacrylic acid, polymers in which hydrogens thereof have been substituted with Li, Na, Ca, or the like, and various copolymers thereof.

The binder may be included at 0.5 wt % to 10 wt %, and preferably, 1 wt % to 5 wt % with respect to the total weight of the negative electrode active material layer in the negative electrode active material layer.

The conductive material is not particularly limited as long as it does not cause a chemical change in the produced battery and has conductivity. As the conductive material, for example, graphite such as natural graphite, artificial graphite, or the like; carbon black such as carbon black, acetylene black, Ketjen black, channel black, furnace black, lamp black, thermal black, or the like; a conductive fiber such as carbon fibers, metal fibers, or the like; a conductive tube such as carbon nanotubes or the like; a metal powder such as fluorocarbon powder, aluminum powder, nickel powder, or the like; a conductive whisker consisting of zinc oxide, potassium titanate, or the like; a conductive metal oxide such as titanium oxide or the like; or a conductive material such as a polyphenylene derivative or the like may be used.

The conductive material may be included at 0.5 wt % to 10 wt %, and preferably, 1 wt % to 5 wt % with respect to the total weight of the negative electrode active material layer in the negative electrode active material layer.

The negative electrode active material layer may have a thickness of 10 μm to 100 μm, and preferably, 50 μm to 80 μm.

The method of producing a negative electrode for a secondary battery of the present invention includes preparing a pre-lithiation cell including the negative electrode structure, a lithium metal counter electrode disposed to face the negative electrode active material layer, and a separator interposed between the negative electrode structure and the lithium metal counter electrode. The pre-lithiation cell may be produced to carry out the pre-lithiation of the negative electrode structure by electrochemical charging.

The separator may prevent the short circuit of the electrode, which may occur when the negative electrode structure and the lithium metal are in direct contact with each other during the electrochemical charging, and may prevent the problem in which an intercalation rate of lithium into the negative electrode structure is not controlled when the negative electrode structure and the lithium metal are in direct contact with each other.

As the separator, a separator that exhibits low resistance to the migration of lithium ions and has an excellent electrolyte impregnation ability is preferred. Specifically, the separator may include: a porous polymer film including at least one selected from the group consisting of an ethylene polymer, a propylene polymer, an ethylene/butene copolymer, an ethylene/hexene copolymer, an ethylene/methacrylate copolymer, and an olefin-based polymer; a porous non-woven fabric including at least one selected from the group consisting of high-melting-point glass fiber and polyethylene terephthalate fiber; or a combination of two or more thereof. In view of ensuring mechanical stability and chemical stability, the separator preferably includes a porous polymer film and more preferably includes a propylene polymer.

The separator may have a thickness of 5 to 50 μm, and preferably, 7 to 20 μm in view of smoothly intercalating lithium into the negative electrode structure.

The method of producing a negative electrode for a secondary battery of the present invention includes immersing the pre-lithiation cell in a pre-lithiation solution.

The pre-lithiation solution may include a lithium salt and an organic solvent.

The organic solvent is not particularly limited as long as it may serve as a medium through which ions involved in an electrochemical reaction can migrate. Specifically, as the organic solvent, an ester-based solvent such as methyl acetate, ethyl acetate, γ-butyrolactone, ε-caprolactone, or the like; an ether-based solvent such as dibutyl ether, tetrahydrofuran, or the like; a ketone-based solvent such as cyclohexanone or the like; an aromatic hydrocarbon-based solvent such as benzene, fluorobenzene, or the like; a carbonate-based solvent such as dimethyl carbonate (DMC), diethyl carbonate (DEC), ethyl methyl carbonate (EMC), ethylene carbonate (EC), propylene carbonate (PC), or the like; an alcohol-based solvent such as ethyl alcohol, isopropyl alcohol, or the like; a nitrile such as R—CN (R is a C2-C20 hydrocarbon group with a linear, branched or cyclic structure and may include a double-bonded aromatic ring or an ether linkage) or the like; an amide such as dimethylformamide or the like; dioxolane such as 1,3-dioxolane or the like; or sulfolane may be used. Among those listed above, a carbonate-based solvent is preferred, and EMC, EC, or the like is more preferred in view of improving electrochemical stability.

The lithium salt may include at least one selected from the group consisting of $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$. LiCl, LiI, and $LiB(C_2O_4)_2$ and preferably includes $LiPF_6$.

A concentration of the lithium salt may be in the range of 0.1 M to 3 M, and preferably, 0.5 M to 1.5 M based on the pre-lithiation solution, and it is preferable that the concentration of the lithium salt is within the above-described range in that the lithium salt can be sufficiently dissolved so that lithium ions can be smoothly intercalated into the active material.

In view of stabilizing the surface of the negative electrode active material to smoothly carry out pre-lithiation, the pre-lithiation solution may further include at least one additive selected from the group consisting of fluoroethylene carbonate (FEC), vinylene carbonate (VC), polystyrene (PS), succinonitrile, ethylene glycol bis(propionitrile) ether, and lithium bis(fluorosulfonyl)imide (LiFSI) and preferably further includes an additive including fluoroethylene carbonate.

The additive may be included at 0.1 wt % to 15 wt %, and preferably, 0.5 wt % to 5 wt % with respect to the total weight of the pre-lithiation solution in the pre-lithiation solution in view of stabilizing the surface of the negative electrode active material to smoothly carry out pre-lithiation.

The immersion of the pre-lithiation cell may be carried out for 0.5 hours to 15 hours, and preferably, 2 hours to 5 hours in view of stably and uniformly carrying out pre-lithiation.

The method of producing a negative electrode for a secondary battery of the present invention includes carrying out pre-lithiation by electrochemically charging the pre-lithiation cell while pressing the same at a pressure of 15 kPa to 3,200 kPa.

According to the method of producing a negative electrode for a secondary battery of the present invention, since pre-lithiation is carried out while applying a predetermined range of pressure to the above-produced pre-lithiation cell, even when lithium is intercalated into the negative electrode structure or negative electrode active material through the pre-lithiation, contacts or distances between the negative electrode active materials may be maintained, and the volume expansion and structural deformation of the negative electrode structure may be prevented. Accordingly, according to the negative electrode produced by the method of producing a negative electrode for a secondary battery of the present invention, resistance may be prevented from being increased, an excellent capacity retention rate may be realized, and cycle characteristics may be improved.

The pre-lithiation cell is pressed at a pressure of 15 kPa to 3,200 kPa. When the pre-lithiation cell is pressed at a pressure of less than 15 kPa, the volume expansion of the negative electrode may not be suppressed due to insufficient pressure during the pressing, and negative electrode active materials may not smoothly be in contact with each other. On the other hand, when the pre-lithiation cell is pressed at a pressure of more than 3,200 kPa, the pre-lithiation cell is damaged due to an excessive pressure, and structure collapse of and damage to the negative electrode active material occur, thereby the lifetime characteristics of the cell may be degraded. Therefore, it is not preferable that the pre-lithiation cell is pressed at a pressure beyond the above-described range.

The pre-lithiation cell is preferably pressed at a pressure of 300 kPa to 2,000 kPa, and more preferably, 800 kPa to 1,400 kPa. It is preferable that the pre-lithiation cell is pressed at a pressure within the above-described range in that the negative electrode active material can be prevented from being damaged and structurally collapsing, the volume expansion caused by pre-lithiation can also be prevented, and contactability between negative electrode active materials can be improved to prevent an increase in resistance.

The pressing may be carried out in a state in which the pre-lithiation cell is placed between a pair of pressing plates or pressing jigs, and accordingly, it is possible to stably press the cell. The pressing plate or pressing jig may be configured so that a pressure thereof may be adjusted using a torque wrench.

The pressing may be carried out in a state in which two or more pre-lithiation cells are stacked, and a plurality of pre-lithiation cells may be subjected to pre-lithiation to reduce a pre-lithiation time and improve efficiency.

Specifically, a cell structure in which two or more pre-lithiation cells are stacked may be placed between a pair of pressing plates or pressing jigs and pressed.

When two or more pre-lithiation cells are stacked, an additional separator may be further interposed between the plurality of pre-lithiation cells. When the pre-lithiation cells are pressed with the additional separator interposed therebetween, pre-lithiation may be more stably carried out.

When the pressing step is carried out in a state in which two or more pre-lithiation cells are stacked, the number of stacked pre-lithiation cells may be determined in consideration of a thickness of the pre-lithiation cell, a range of pressure applied during the pressing, and the like. Specifically, when the pressing step is carried out in a state in which two or more pre-lithiation cells are stacked, 2 to 15 pre-lithiation cells, and preferably, 4 to 8 pre-lithiation cells, may be stacked.

The pre-lithiation step may be carried out, specifically, by electrochemical charging, and accordingly, lithium may be intercalated into the negative electrode active material.

The lithium may be intercalated into the inside and/or surface of the negative electrode active material through the pre-lithiation step. The lithium may be intercalated in the form of lithium ions, a lithium compound and/or a lithium metal into the negative electrode active material or, after the intercalation, may react with the negative electrode active material to be alloyed.

The electrochemical charging may be carried out by oxidizing and reducing the pressed pre-lithiation cell using an electrochemical charging/discharging device.

The pre-lithiation step may be carried out by electrochemically charging the pre-lithiation cell at a current density of 0.2 $mA/cm^2$ to 10 $mA/cm^2$, and preferably, 0.5 $mA/cm^2$ to 3 $mA/cm^2$. When the pre-lithiation cell is electrochemically charged at a current density within the above-described range, the negative electrode active material can be subjected to stable and uniform pre-lithiation.

The pre-lithiation step may be carried out by electrochemical charging to 5% to 50% state of charge (SOC), preferably, 15% to 35% SOC of the negative electrode structure. It is preferable that the pre-lithiation step is carried out by electrochemical charging to the above-described SOC range in that a passivation film can be uniformly and stably formed on the surface of the negative electrode structure to improve the reversible capacity of a battery, and accordingly, the cycle characteristics of a battery can be improved.

The SOC of the negative electrode structure may be defined as an SOC of the pre-lithiation cell when being charged at a current density of 0.1 C up to a voltage of 0.005 V in a CC mode and then charged at the same voltage of 0.005 V up to a current density of 0.005 C in a CV mode.

The method of producing a negative electrode for a secondary battery of the present invention may further include, after the pre-lithiation step, peeling the lithium metal counter electrode and the separator from the negative electrode structure. By separating the lithium metal counter electrode and the separator from the negative electrode structure, the negative electrode structure may be produced as a pre-lithiated negative electrode.

The negative electrode structure may be assembled with a positive electrode, a separator, an electrolyte, and the like as described below, and accordingly, a secondary battery, specifically a lithium secondary battery, may be produced.

The negative electrode produced by the above-described method has improved reversibility and improved initial efficiency due to being pre-lithiated, and since the negative electrode structure is pre-lithiated while being pressed, the contacts between negative electrode active materials are maintained, and less volume expansion and less structural deformation of the negative electrode occur. Accordingly, the negative electrode produced by the above-described method is preferably applied to a secondary battery, specifically, a lithium secondary battery.

The secondary battery may include the negative electrode for a secondary battery which is produced by the above-described method; a positive electrode disposed to face the negative electrode for a secondary battery; a separator interposed between the negative electrode for a secondary battery and the positive electrode; and an electrolyte. Details of the negative electrode for a secondary battery have been described above, and the positive electrode, separator, and electrolyte may be used without limitation as long as they are commonly used in a lithium secondary battery.

The secondary battery is useful in the field of portable devices, such as mobile phones, notebook computers, digital cameras, and the like, and electric vehicles such as hybrid electric vehicles (HEVs).

In addition, the secondary battery may be applied to a battery module including the secondary battery as a unit cell or a battery pack including the battery module.

The battery module or battery pack may be used as a power source of one or more medium-to-large-sized devices selected from a power tool; electric vehicles (EVs), hybrid electric vehicles, and plug-in hybrid electric vehicles (PHEVs); and a system for storing electric power.

Hereinafter, the present invention will be described in detail with reference to Examples so that those skilled in the art can easily carry out the present invention. However, the present invention may be embodied in several different forms, and therefore, is not limited to Examples described herein.

EXAMPLES

Example 1: Production of Negative Electrode for Secondary Battery

<Fabrication of Negative Electrode Structure>

Natural graphite (average particle diameter ($D_{50}$): 20 μm) and SiO (average particle diameter ($D_{50}$): 5 μm) were mixed in a weight ratio of 70:30 to prepare a negative electrode active material.

The negative electrode active material, Denka black as a conductive material, styrene-butadiene rubber (SBR) as a binder, and carboxymethyl cellulose as a thickener were mixed in a weight ratio of 92:3:3.5:1.5 to prepare a negative electrode slurry.

The negative electrode slurry was applied onto both surfaces of a copper current collector (thickness: 8 μm), and the resulting copper current collector was roll-pressed and dried in a 130° C. vacuum oven for 12 hours to form a negative electrode active material layer (thickness: 70 μm) on both surfaces of the copper negative electrode current collector. The copper negative electrode current collector including the negative electrode active material layer formed on both surfaces thereof was cut into a size of 34 mm×50 mm to fabricate a negative electrode structure.

<Pre-Lithiation by Electrochemical Charging>

Lithium metal counter electrodes were disposed opposite to each other on both surfaces of the negative electrode structure, and then polypropylene separators were interposed between the negative electrode structure and the lithium metal counter electrode to produce a pre-lithiation cell. Then, six pre-lithiation cells were stacked, and polypropylene separators were additionally interposed between the pre-lithiation cells.

$LiPF_6$ as a lithium salt was added at a concentration of 1 M to an organic solvent in which ethylene carbonate (EC) and ethyl methyl carbonate (EMC) were mixed in a volume ratio of 30:70, and fluoroethylene carbonate (FEC) as an additive was added at 2 wt % with respect to a total weight of a pre-lithiation solution to prepare a pre-lithiation solution. The structure in which six pre-lithiation cells had been stacked was immersed in the pre-lithiation solution for 3 hours.

Afterward, the structure in which six pre-lithiation cells had been stacked was placed between a pair of pressing jigs, and, while being pressed at a pressure of 1,000 kPa using a torque wrench, the structure was electrochemically charged to 25% SOC of the negative electrode structure at a current density of 2 $mA/cm^2$ using an electrochemical charging/discharging device (WBCS3000S manufactured by WonATech) to pre-lithiate the negative electrode structure.

Then, individual pre-lithiation cells were separated from the structure in which six pre-lithiation cells had been stacked. In the pre-lithiation cell, the separator, the additionally interposed separator, and the lithium metal counter electrode were peeled or separated from the negative electrode structure. The negative electrode structure thus separated was washed with an EMC solvent and dried at room temperature, and the resulting negative electrode structure was determined as a negative electrode for a secondary battery of Example 1.

Example 2: Production of Negative Electrode for Secondary Battery

A negative electrode for a secondary battery of Example 2 was produced in the same manner as in Example 1 except that pressing was carried out at a pressure of 500 kPa.

Example 3: Production of Negative Electrode for Secondary Battery

A negative electrode for a secondary battery of Example 3 was produced in the same manner as in Example 1 except that pressing was carried out at a pressure of 1,800 kPa.

Example 4: Production of Negative Electrode for Secondary Battery

A negative electrode for a secondary battery of Example 4 was produced in the same manner as in Example 1 except that pressing was carried out at a pressure of 25 kPa.

Example 5: Production of Negative Electrode for Secondary Battery

A negative electrode for a secondary battery of Example 5 was produced in the same manner as in Example 1 except that pressing was carried out at a pressure of 2,500 kPa.

Comparative Example 1: Production of Negative Electrode for Secondary Battery The negative electrode structure fabricated in Example 1 was immersed in the pre-lithiation solution prepared in Example 1 for 3 hours. Then, lithium metal counter electrodes were disposed to be spaced 1 cm from both surfaces of the negative electrode structure to produce a pre-lithiation cell. In the case of Comparative Example 1, a separator was not interposed between the lithium metal counter electrode and the negative electrode structure.

Afterward, without a pressing process, the pre-lithiation cell was electrochemically charged to 25% SOC of the negative electrode structure at a current density of 2 mA/cm$^2$ using an electrochemical charging/discharging device (WBCS3000S manufactured by WonATech) to pre-lithiate the negative electrode structure.

Then, the lithium metal counter electrode was separated from the negative electrode structure. The negative electrode structure thus separated was washed with an EMC solvent and dried at room temperature, and the resulting negative electrode structure was determined as a negative electrode for a secondary battery of Comparative Example 1.

Comparative Example 2: Production of Negative Electrode for Secondary Battery A negative electrode for a secondary battery of Comparative Example 2 was produced in the same manner as in Example 1 except that a pressing process was not carried out.

Comparative Example 3: Production of Negative Electrode for Secondary Battery A negative electrode for a secondary battery of Comparative Example 3 was produced in the same manner as in Example 1 except that pressing was carried out at a pressure of 5 kPa.

Comparative Example 4: Production of Negative Electrode for Secondary Battery A negative electrode for a secondary battery of Comparative Example 4 was produced in the same manner as in Example 1 except that pressing was carried out at a pressure of 4,000 kPa.

Experimental Example 1: Evaluation of Capacity Retention Rate

<Production of Lithium Secondary Battery>

$LiNi_{0.8}Co_{0.1}Mn_{0.1}O_2$ as a positive electrode active material, Super C as a conductive material, and polyvinylidene fluoride (PVDF) as a binder were mixed in a weight ratio of 97:1.5:1.5 to prepare a positive electrode slurry, the positive electrode slurry was applied onto an aluminum current collector, and the resulting aluminum current collector was roll-pressed and dried at 130° C. to produce a positive electrode.

A polypropylene separator was interposed between the negative electrode for a secondary battery according to each of Examples 1 to 5 and Comparative Examples 1 to 4 and the above-produced positive electrode, and an electrolyte was injected to produce a lithium secondary battery. The electrolyte was prepared by adding $LiPF_6$ as a lithium salt at a concentration of 1 M to an organic solvent in which EC and EMC were mixed in a volume ratio of 30:70 and adding FEC as an additive at 2 wt % with respect to the total weight of an electrolyte.

<Evaluation of Capacity Retention Rate>

The discharge capacity and capacity retention rate of the lithium secondary batteries according to Examples and Comparative Examples were evaluated using an electrochemical charging/discharging device. In this case, the lithium secondary batteries were charged while applying current at a current density of 0.1 C-rate up to 4.2 V and discharged at the same current density up to 2.5 V.

The capacity retention rate was evaluated by measuring the discharge capacities of the lithium secondary batteries according to Examples and Comparative Examples at $1^{st}$ and $100^{th}$ cycles and substituting the resulting values into the following Equation 1, and results thereof are shown in the following Table 1.

Capacity retention rate (%)=(Discharge capacity at $100^{th}$ cycle)/(Discharge capacity at $1^{st}$ cycle)×100 [Equation 1]

TABLE 1

|  | Capacity retention rate (%) @ 100 cycle |
| --- | --- |
| Example 1 | 94 |
| Example 2 | 92 |
| Example 3 | 93 |
| Example 4 | 90 |
| Example 5 | 91 |
| Comparative Example 1 | 81 |
| Comparative Example 2 | 82 |
| Comparative Example 3 | 85 |
| Comparative Example 4 | 78 |

Referring to Table 1, it can be seen that the negative electrodes for a secondary battery according to Examples 1 to 5, which were produced by carrying out pre-lithiation while pressing at a specific range of pressure, exhibited a remarkably improved capacity retention rate compared to the negative electrodes for a secondary battery according to Comparative Examples 1 to 4 which were produced by carrying out pre-lithiation while pressing at a pressure beyond the specific range or not carrying out a pressing process.

The invention claimed is:

1. A method of producing a negative electrode for a secondary battery, the method comprising:
    forming a negative electrode structure comprising a negative electrode current collector having two surfaces and a negative electrode active material layer formed on at least one surface of the negative electrode current collector;
    preparing a pre-lithiation cell comprising the negative electrode structure, a lithium metal counter electrode disposed to face the negative electrode active material layer of the negative electrode structure, and a separator interposed between the negative electrode structure and the lithium metal counter electrode;
    immersing the pre-lithiation cell in a pre-lithiation solution;

carrying out pre-lithiation by electrochemically charging the pre-lithiation cell while pressing the pre-lithiation cell at a pressure of 15 kPa to 3,200 kPa; and after the pre-lithiation step, peeling the lithium metal counter electrode and the separator from the negative electrode structure.

2. The method of claim 1, wherein the negative electrode active material layer is formed on both surfaces of the negative electrode current collector.

3. The method of claim 1, wherein the negative electrode active material layer comprises a negative electrode active material, and the negative electrode active material comprises at least one selected from the group consisting of a carbon-based active material and a silicon-based active material.

4. The method of claim 3, wherein the negative electrode active material comprises the carbon-based active material and the silicon-based active material in a weight ratio of 50:50 to 95:5.

5. The method of claim 1, wherein the pre-lithiation solution comprises a lithium salt and an organic solvent.

6. The method of claim 1, wherein the pressing step is carried out in a state in which the pre-lithiation cell is placed between a pair of pressing plates.

7. The method of claim 1, wherein the pressing step is carried out at a pressure of 300 kPa to 2,000 kPa.

8. The method of claim 1, wherein the pressing step is carried out in a state in which two or more pre-lithiation cells are stacked.

9. The method of claim 1, wherein the pre-lithiation step is carried out by electrochemically charging the pre-lithiation cell at a current density of 0.2 mA/cm$^2$ to 10 mA/cm$^2$.

10. The method of claim 1, wherein the pre-lithiation step is carried out by electrochemical charging to 5% to 50% state of charge (SOC) of the negative electrode structure.

* * * * *